(12) United States Patent
Mandelstein et al.

(10) Patent No.: US 8,694,918 B2
(45) Date of Patent: Apr. 8, 2014

(54) CONVEYING HIERARCHICAL ELEMENTS OF A USER INTERFACE

(75) Inventors: Dan J. Mandelstein, Austin, TX (US);
Ivan M. Milman, Austin, TX (US);
Martin A. Oberhofer, Bondorf (DE);
Sushain Pandit, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 37 days.

(21) Appl. No.: 13/366,629

(22) Filed: Feb. 6, 2012

(65) Prior Publication Data

US 2013/0205252 A1 Aug. 8, 2013

(51) Int. Cl.
*G06F 3/048* (2013.01)

(52) U.S. Cl.
USPC .......................................... 715/810

(58) Field of Classification Search
USPC .......................................... 715/810
See application file for complete search history.

(56) References Cited

U.S. PATENT DOCUMENTS

| | | | |
|---|---|---|---|
| 6,526,399 B1* | 2/2003 | Coulson et al. ................ | 1/1 |
| 7,313,761 B1 | 12/2007 | Mcclellan | |
| 7,343,585 B1 | 3/2008 | Lau et al. | |
| 7,701,869 B2 | 4/2010 | Hogan | |
| 7,885,206 B2 | 2/2011 | Sapsford et al. | |
| 7,930,678 B2 | 4/2011 | Tian et al. | |
| 2003/0085997 A1* | 5/2003 | Takagi et al. ................ | 348/143 |
| 2005/0007383 A1 | 1/2005 | Potter et al. | |
| 2005/0132336 A1 | 6/2005 | Gotwals et al. | |
| 2006/0184589 A1* | 8/2006 | Lees et al. ................ | 707/201 |
| 2006/0225028 A1 | 10/2006 | Lau et al. | |
| 2006/0288183 A1* | 12/2006 | Boaz et al. ................ | 711/164 |
| 2008/0270458 A1 | 10/2008 | Gvelesiani | |
| 2009/0031281 A1 | 1/2009 | Zhang et al. | |
| 2010/0180230 A1 | 7/2010 | Bogner et al. | |

OTHER PUBLICATIONS

Boukhelifa, Nadia et al., A Coordination Model for Exploratory Multi-View Visualization, Proceedings of the conference on Coordinated and Multiple Views in Exploratory Visualization, Jul. 15, 2003, pp. 76-85, IEEE Computer Society, Washington, DC United States.

Dearman, David et al., Adding Control-Flow to a Visual Data-Flow Representation, Proceedings of the 13th International Workshop on Program Comprehension, May 2005, pp. 297-306, IEEE Computer Society, Washington, DC United States.

Hagman, Johan, An Automatic Method for Arranging Symbols and Widgets to Reflect their Internal Relations, CHI '97 extended abstracts on Human factors in computing, Mar. 1997, pp. 337-338, ACM, New York, New York, United States.

Jain, A.K. et al., Data Clustering: A Review, ACM Computing Surveys, Sep. 1999, pp. 264-323, vol. 31, Issue 3, ACM, New York, New York, United States.

(Continued)

*Primary Examiner* — William Bashore
*Assistant Examiner* — Rayeez Chowdhury
(74) *Attorney, Agent, or Firm* — Patterson & Sheridan, LLP

(57) ABSTRACT

Techniques are disclosed for generating a view of a data flow model. One or more groupings of data flow objects in the data flow model is determined, based on an ontology. At least a first one of the groupings is collapsed in the view. The view is output for display in a user interface configured to selectively expand and collapse the first group based on user input.

19 Claims, 9 Drawing Sheets

(56) References Cited

OTHER PUBLICATIONS

Kumar, Harsha P. et al., Browsing hierarchical data with multi-level dynamic queries and pruning, International Journal of Human-Computer Studies, 1997, pp. 103-124, Academic Press Limited, Atlanta, GA, United States.

Zhou, Dehui et al., CloudView: Describe and Maintain Resource View in Cloud, Second IEEE International Conference on Cloud Computing Technology and Science, 2010, pp. 151-158, IEEE Computer Society, Washington, DC United States.

* cited by examiner

| | Attribute | | | | |
|---|---|---|---|---|---|
| Object type | Granularity | Edge frequency | Valid parent nodes | Valid child nodes | |
| 410₁ — Data table | Fine-grained | Low | ETL operator | None | |
| 410₂ — ETL operator | Fine-grained | Low to medium | ETL job | Data table | |
| 410₃ — ETL job | Medium | Medium to very high | Integration node, data mart | ETL operator | |
| 410₄ — Integration node | Medium | Medium to very high | MDM system, BI system enterprise application | ETL job, ESB flow | |
| 410₅ — Data mart | Medium | Low | BI system | Integration node, ETL job | |
| 410₆ — Enterprise application | Medium | Low | None | Integration node | |
| 410₇ — BI system | Coarse-grained | Low | Bi consumer | Integration node, data mart | |
| 410₈ — BI consumer | Coarse-grained | Low | None | BI system, cubing services | |
| 410₉ — MDM system | Coarse-grained | Low | None | Integration node | |

FIG. 4

CONVEYING HIERARCHICAL ELEMENTS OF A USER INTERFACE

BACKGROUND

Organizations commonly manage large-scale information systems, which can include a very large number of both interrelated and independent information assets. While information assets can vary in nature, examples include structured systems such as traditional relational databases as well as unstructured systems such as content repositories and document stores. The degree of formality with which these systems are monitored, registered and/or managed can vary extensively within a large enterprise. It is not unusual for a large enterprise to manage thousands of distinct information repositories along with a (sometimes unknown) number of ad-hoc data stores and local working environments, which can themselves also number in the thousands. As noted, the information assets of a given enterprise may often be interdependent. For example, one information asset may store data extracts from another information asset. Similarly, information assets can share processing states during data integration (or during extract, transform and load (ETL) processes) or provide related information repositories which store equivalent information segmented by line of business, and so on.

SUMMARY

Embodiments of the invention provide a method, computer program product and system for performing an operation for generating a view of a data flow model. The operation includes receiving the data flow model, where the data flow model includes a plurality of data flow objects, where each data flow object is distinctly identifiable via a respective data flow object name. The operation also includes determining, based on an ontology, one or more groupings of the plurality of data flow objects, each grouping containing a respective plurality of data flow objects, where each grouping is distinctly identifiable via a respective grouping name. The operation also includes collapsing at least a first one of the groupings in the view, such that the first grouping is visible in the view while any data flow object in the first grouping is not visible. The operation also includes outputting the view for display in a user interface configured to selectively expand and collapse the first grouping based on user input.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIG. 4 illustrates an object type specification for determining groupings of data flow objects, according to one embodiment of the invention.

DETAILED DESCRIPTION

Figure 1:
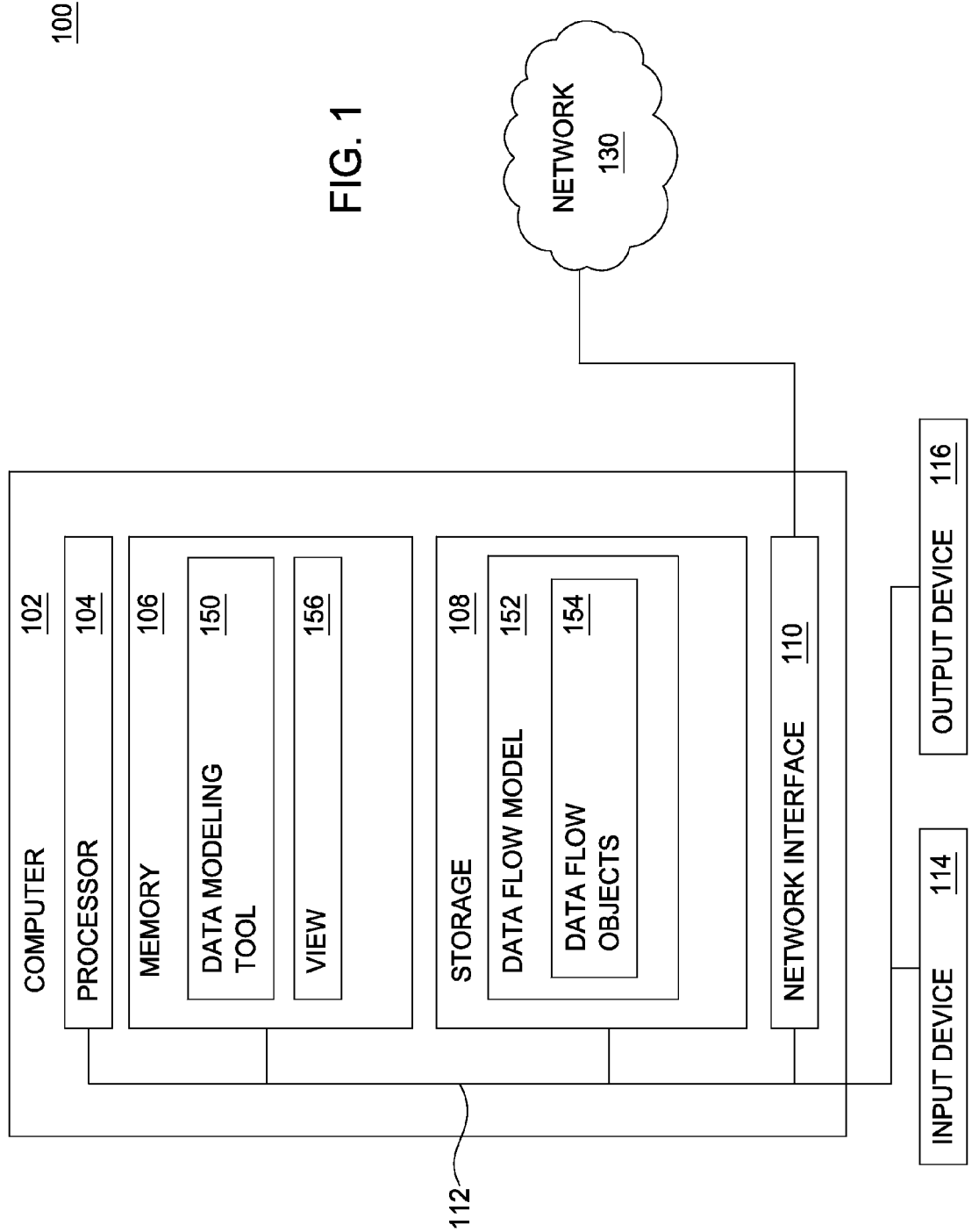
FIG. 1 is a block diagram illustrating a system for generating a view of a data flow model, according to one embodiment of the invention.

Embodiments of the invention provide techniques for generating a view of a data flow model representing a plurality of information assets. As used herein, an information asset refers to any form of information technology used by a given organizational entity or grouping thereof, e.g., application servers, databases and underlying tables and columns, data models, functions, jobs, scripts, ETL tools or processes, reports, network services, other server systems and applications, networking devices, appliance systems, etc. Each information asset may be modeled as a data flow object in the data flow model. In one embodiment, a viewing tool is provided that is configured to generate a view of a received data flow model. In generating the view, the viewing tool programmatically groups data flow objects in a data flow model. The viewing tool also collapses at least one of the groups in the view. At least in some embodiments, at least one other group remains expanded in the view. The viewing tool then outputs the view for display to a user.

By using the techniques disclosed herein, the data modeling tool may generate views that are more user-friendly than alternative approaches that do not involve programmatically grouping and/or collapsing data flow objects. In particular, the techniques disclosed herein may be used to generate views for which user-friendliness better scales with complexity of the views, e.g., as measured by a count of data flow objects in the views. Further, by using the techniques disclosed herein, views may be generated more efficiently in some cases, at least relative to alternative approaches that require manual user input specifying which data flow objects to group together and/or collapse. The generated views may also be more effective at hiding complexity than such alternative approaches.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, the information assets and/or data flow models may be stored in the cloud. Having the information assets and data flow models stored in the cloud allows the user to access the information assets and data flow models from any computing system attached to a network connected to the cloud (e.g., the Internet).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 is a block diagram illustrating a system 100 for generating a view of a data flow model, according to one embodiment of the invention. The networked system 100 includes a computer 102. The computer 102 may also be connected to other computers via a network 130. In general, the network 130 may be a telecommunications network and/or a wide area network (WAN). In a particular embodiment, the network 130 is the Internet.

The computer 102 generally includes a processor 104 connected via a bus 112 to a memory 106, a network interface device 110, a storage 108, an input device 114, and an output device 116. The computer 102 is generally under the control of an operating system. Examples of operating systems include UNIX, versions of the Microsoft Windows operating system, and distributions of the Linux operating system. (UNIX is a registered trademark of The Open Group in the United States and other countries. Linux is a registered trademark of Linus Torvalds in the United States, other countries, or both. Microsoft, Windows is a trademark of Microsoft Corporation in the United States, other countries, or both.) More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single entity, it should be understood that the memory 106 may comprise a plurality of modules, and that the memory 106 may exist at multiple levels, from high speed registers and caches to lower speed but larger DRAM chips. The network interface device 110 may be any type of network communications device allowing the computer 102 to communicate with other computers via the network 130.

The storage 108 may be a persistent storage device. Although the storage 108 is shown as a single unit, the storage 108 may be a combination of fixed and/or removable storage devices, such as fixed disc drives, solid state drives, floppy disc drives, tape drives, removable memory cards or optical storage. The memory 106 and the storage 108 may be part of one virtual address space spanning multiple primary and secondary storage devices.

The input device 114 may be any device for providing input to the computer 102. For example, a keyboard and/or a mouse may be used. The output device 116 may be any device for providing output to a user of the computer 102. For example, the output device 116 may be any conventional display screen or set of speakers. Although shown separately from the input device 114, the output device 116 and input device 114 may be combined. For example, a display screen with an integrated touch-screen may be used.

As described above, one embodiment provides a viewing tool configured to generate a view of a received data flow model. One example of a viewing tool is a data modeling tool such as the IBM InfoSphere Data Architect data design solution. The Data Architect is configured to allow users to discover, model, visualize, relate, and/or standardize enterprise data assets. Another example of a viewing tool is a solution architecting tool such as the IBM InfoSphere Blueprint Director also available from IBM Corporation. The Blueprint Director is configured to allow users such as information architects to define a solution architecture for an information project such as a business intelligence (BI) project, a Master Data Management (MDM) project, or a data consolidation project. Still another example of a viewing tool is a data impact analysis tool (also referred to as a data lineage tool) such as the IBM InfoSphere Metadata Workbench. The Metadata Workbench is configured to allow users such as ETL developers to troubleshoot ETL data feed issues by examining a specified part or all of an ETL architecture for a data warehouse. In some cases, the ETL architecture may contain tens of thousands of ETL jobs for extracting, cleansing, and transforming data from various data sources of the data warehouse. (IBM and InfoSphere are trademarks of International Business Machines Corporation, registered in many jurisdictions worldwide.)

Further, although embodiments are described herein with reference to the particular embodiment of a data modeling tool, such is not intended to be limiting of the invention. Those skilled in the art will recognize that the techniques disclosed herein may be employed in any viewing tool generally, including solution architecting tools, data impact analysis tools, etc.

As shown, the memory 106 of the computer 102 includes a data modeling tool 150 configured to generate a view 156 of a data flow model 152, the data flow model 152 containing data flow objects 154. As shown, the data flow model 152 is included in the storage 108 of the computer 102. The data flow model 152 may also be referred to as a solution diagram, which may pertain to various solutions such as BI, Master Data Management (MDM), ETL, etc. In one embodiment, the data modeling tool 150 is further configured to generate the data flow model 152 based on user input. To this end, the data modeling tool 150 may allow a user to: add information assets to the data flow model 152 as data flow objects 154 and/or link the data flow objects 154 in the data flow model 152, etc. Once generated, the data flow model 152 may aid the user in addressing business needs such as information asset management, data flow management, data impact analysis, data lineage determination, etc.

Figure 2A:
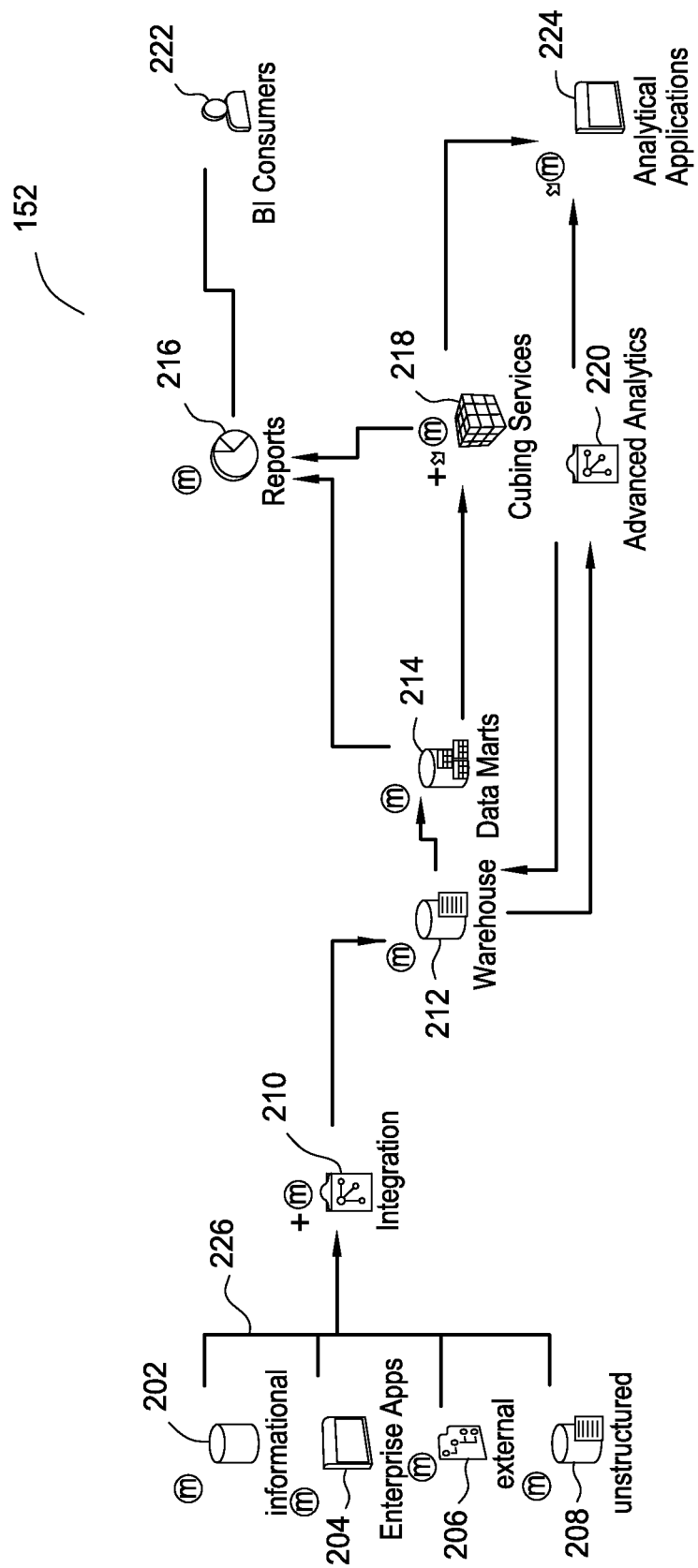
FIGS. 2A-2C illustrate the data flow model and a view thereof, according to one embodiment of the invention.

FIG. 2A illustrates the data flow model 152, according to one embodiment of the invention. As shown, the data flow model 152 includes data flow objects 202, 204, 206, 208 representing informational data, enterprise applications, external data, and unstructured data, respectively. The data flow model 152 further includes data flow objects 210, 212, 214 representing data integration, data warehouse, and data marts, respectively. The data flow model 152 further includes data flow objects 216, 218, 220, 222, 224 representing reports, cubing services, advanced analytics, BI consumers, and analytical applications, respectively. The data flow model 162 also contains edges connecting the data flow objects. For example, an edge 226 connects each of the data flow objects 202, 204, 206, 208 to the data flow object 210 representing data integration. Similarly, the data flow object 210 representing data integration is connected to the data flow object 212 representing data warehouse, and so forth.

As described above, the data modeling tool 150 is configured to generate the view 156 of the data flow model 152. To this end, in one embodiment, the data modeling tool 150 programmatically determines one or more groupings of the data flow objects in the data flow model 152. In some embodiments, each grouping may be distinctly identifiable via a respective grouping name. The grouping name for a grouping may also be programmatically generated based on the data flow objects contained in the grouping. For example, data flow object names and/or substrings thereof may be concatenated or otherwise combined to form a grouping name. In other embodiments, the grouping name may also be generated at least in part based on one or more attributes associated with the data flow objects contained in the grouping, such as object type, object category, etc.

Figure 2B:
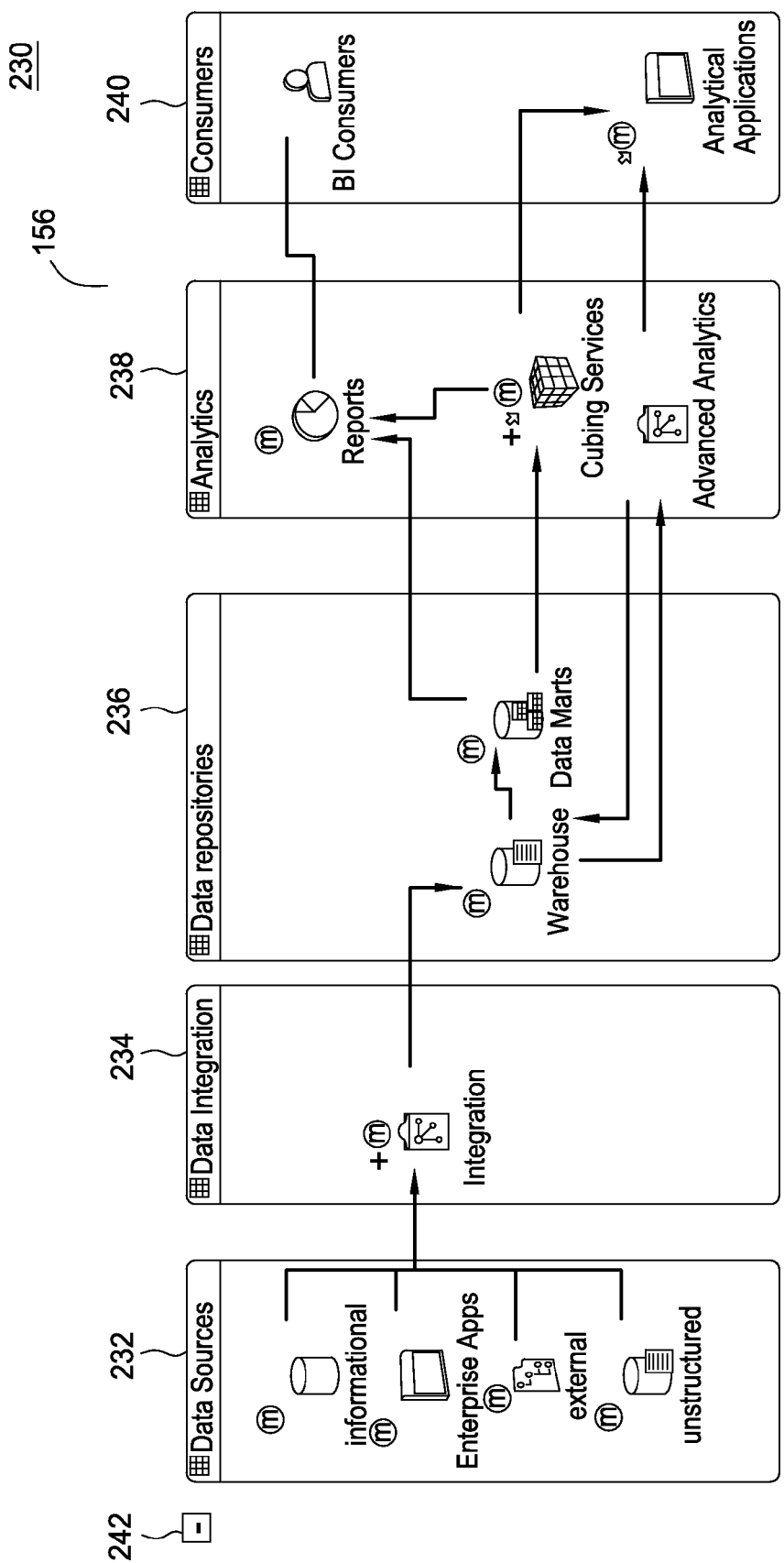
Figure 2C:
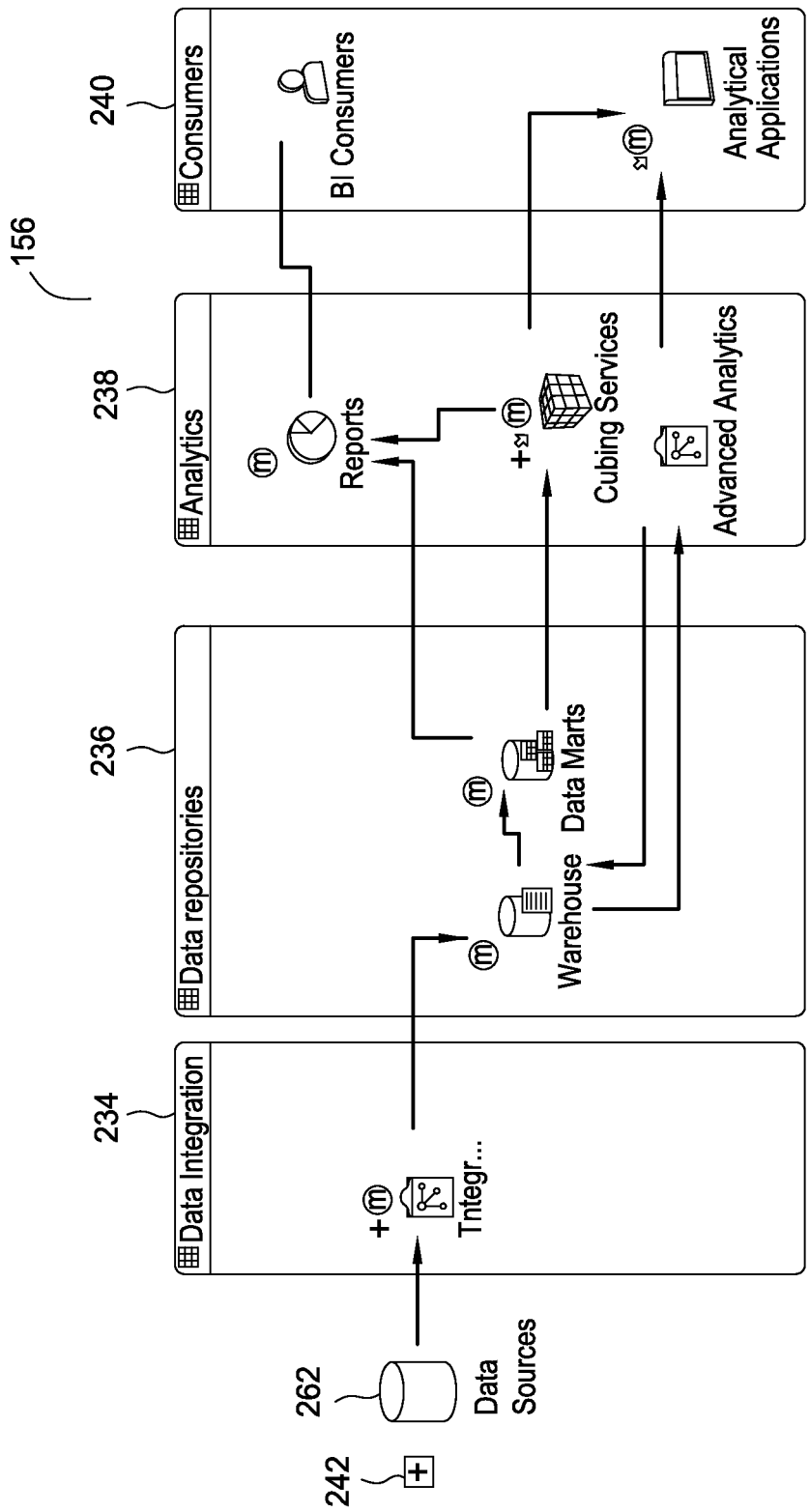

FIGS. 2B-2C illustrates the view 156 of the data flow model 152, according to one embodiment of the invention. As shown in FIG. 2B, the view 156 includes data flow objects 232, 234, 236, 238, 240 representing groupings for data sources, data integration, data repositories, analytics, and consumers, respectively. The grouping for data sources includes the data flow objects representing data integration, data warehouse, and data marts, respectively. The grouping for data integration includes the data flow object representing data integration. The grouping for analytics includes the data flow objects representing reports, cubing services, and advanced analytics, respectively. The grouping for consumers includes the data flow objects representing BI consumers and analytical applications, respectively.

In one embodiment, the view 156 also includes a control 242 configured to collapse/expand the data flow object 232 based on user input. For example, upon receiving user input activating the control 242, the data modeling tool 150 may output for display a collapsed version of the data flow object 232, shown in FIG. 2C as the data flow object 262. The collapsed view is characterized by the contained data flow objects 202, 204, 206, 208 being hidden from the view 156. The user may again activate the control 242 to request the data modeling tool 150 to output for display the expanded version of the data flow object 262—i.e., the data flow object 242 of FIG. 2B. The expanded version is characterized by the contained data flow objects 202, 204, 206, 208 being visible in the view 156. In some embodiments, existing groupings may be further grouped into higher-order groupings, thus forming a hierarchy of groupings. Accordingly, by using the techniques disclosed herein, the data modeling tool 150 may generate drastically simplified views of data flow models, especially in cases where the data flow models 152 contain a vast amount of data flow objects to be displayed.

As described above, in one embodiment, the data modeling tool 150 is configured to programmatically determine one or more groupings of the data flow objects in the data flow model 152. The groupings may be determined based on one or more predetermined grouping factors. Examples of grouping factors include an ontology of business terms of an organization, an object type specification for data flow objects, edge counts of data flow objects, and user annotations for data flow objects.

Figure 3:
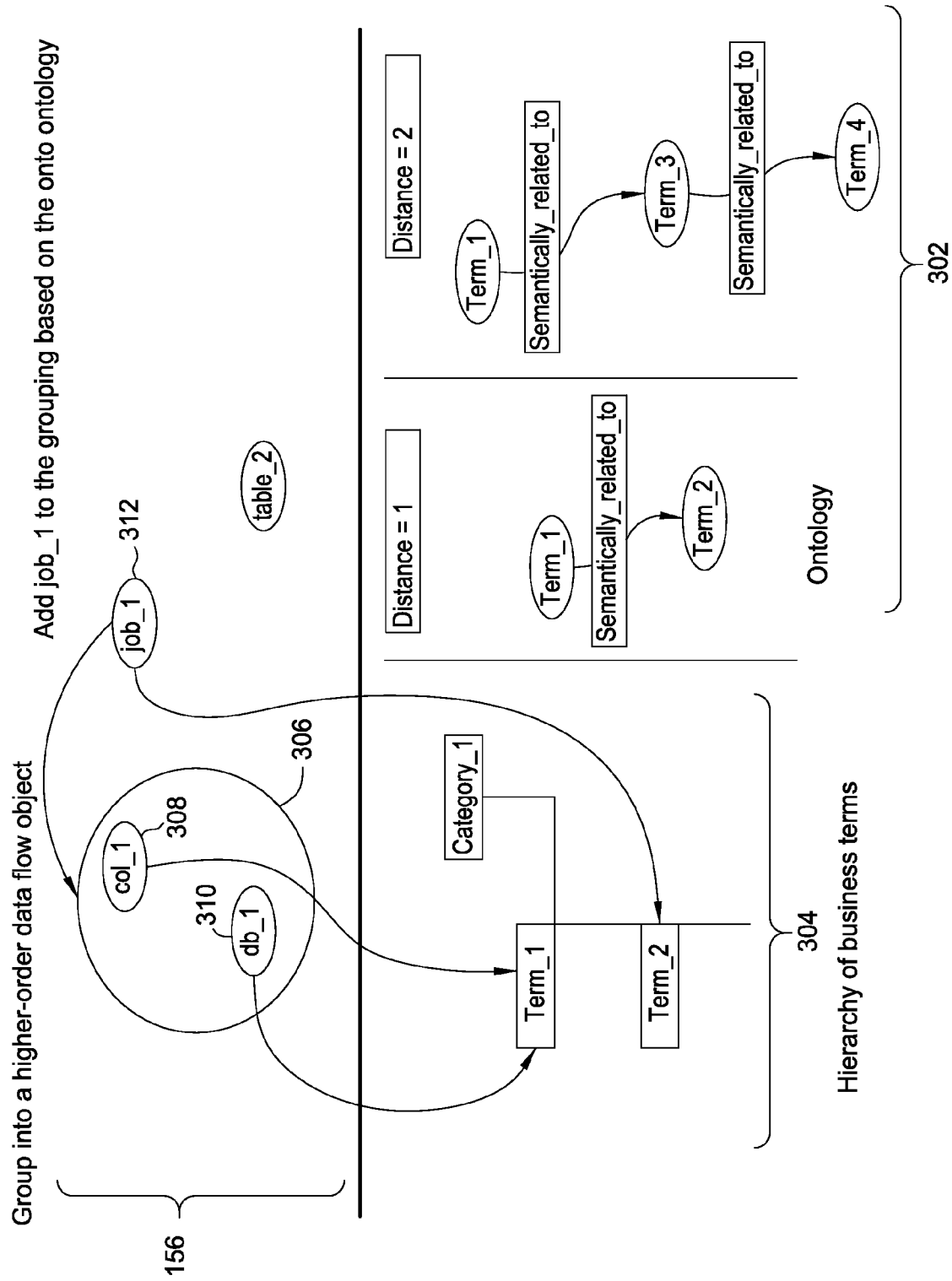
FIG. 3 illustrates an ontology for determining groupings of data flow objects, according to one embodiment of the invention.

FIG. 3 illustrates the ontology of business terms 302, according to one embodiment of the invention. As shown, the ontology of business terms 302 stores associations between business terms retrieved from a predefined hierarchy of business terms 304. Depending on the embodiment, the hierarchy of business terms may be considered as a part of the ontology. The hierarchy of business terms organizes and categorizes business terms of an organization, while the ontology of business terms 302 stores and characterizes associations between business terms to provide descriptive information about the nature of the associations. An example of an association between business terms is one where two different business terms refer to the same concept. The ontology may be used to determine a semantic distance between two business terms, where the semantic distance is measured in terms of a count of associations between business terms.

For example, if the ontology indicates that a first business term is semantically related to a second business term, then the semantic distance between the business terms is one. Alternatively, if the ontology indicates that the first business term is semantically related to a third business term which, in turn, is semantically related to a fourth business term, then the semantic distance between the first and fourth business terms is two. In some embodiments, if the semantic distance between two terms of two data flow objects, respectively, satisfies a predefined threshold, then the two data flow objects are candidates for grouping into a higher-order data flow object. For example, if a data flow object 312 representing an ETL job is sufficiently proximate semantically to a data flow object 308 representing a table column (or a data flow object 310 representing a database), then the data modeling tool 150 may add the data flow object 312 to a higher-order data flow object 306.

FIG. 4 illustrates an object type specification 400 for data flow objects, according to one embodiment of the invention. As described above, in one embodiment, the data modeling tool 150 may determine one or more groupings of the data flow objects based on the object type specification 400. The object type specification 400 describes a set of data flow object types 410 and associated attributes 401. The attributes 401 include granularity 402, edge frequency 404, valid parent nodes 406, and valid child nodes 408. The object types 410 may be organized in the form of an object type hierarchy. In some embodiments, the object type hierarchy is included in the object type specification 400. For example, the object type hierarchy may contain the associations shown in the following Table., in a direction from a leaf node to the root node of the object type hierarchy:

TABLE I

Example object type hierarchy

Data table → ETL operator → ETL job → integration node → BI system

The above table shows associations between object types in a direction from a position proximate to a leaf node in the object type hierarchy to a position proximate to a root node in the object type hierarchy. In particular, data table occupies a low position in the object type hierarchy, while BI system occupies a high position in the object type hierarchy.

In one embodiment, the granularity 402 of an object type characterizes a depth of the object type in the object type hierarchy. For example, an object type having fine-grained granularity may be disposed far away from the root node of the object type hierarchy, while an object type having coarse-grained granularity may be disposed proximate to the root node of the object type hierarchy. The edge frequency 404 of an object type characterizes a count of edges that a data flow object of the object type is expected to have. The valid parent nodes 406 of an object type indicate which object types are allowed as parent nodes of the object type, according to the object type hierarchy. The valid child nodes 408 of an object type indicate which object types are allowed as child nodes of the object type, according to the object type hierarchy. From the valid parent nodes 406 and valid child nodes 408, the data modeling tool 150 may determine a set of valid associations between data flow object types. For example, such a set may include the following data flow object pairs, each pair representing a valid association: (BI system, data mart), (BI system, integration node), (MDM system, integration node), (data table, ETL operator), (ETL operator, ETL job).

In one embodiment, the object types 410 include data table $410_1$, ETL operator $410_2$, ETL job $410_3$, integration node $410_4$, data mart $401_5$, enterprise application $410_6$, BI system $410_7$, BI consumer $410_8$, and MDM system $410_9$. As shown in FIG. 4, data flow objects of the type of data table $410_1$ are expected to have fine-grained granularity and low edge frequency. Further, no child nodes of such data flow objects are valid, but an ETL operator is a valid parent node of such data flow objects. Similarly, the object type specification 400 characterizes the attributes 401 of the other object types 410 in FIG. 4.

As described above, in one embodiment, the data modeling tool 150 may determine one or more groupings of the data flow objects based on edge counts of data flow objects. For example, referring again to FIG. 2A, the data modeling tool 150 may determine that the integration node 210 has four inbound edges from four data flow objects 202, 204, 206, 208, respectively, and that each of the four data flow objects has no other outbound edges. Based on this determination, the data modeling tool 150 may decide to group the four data flow objects to form a higher-order data flow object. Alternatively, if each of the four data flow objects have outbound edges to the same set of data flow objects, then the data modeling tool 150 may group the four data flow objects to form a first higher-order data flow object and optionally also group the set of data flow objects to form a second higher-order data flow object.

As described above, in one embodiment, the data modeling tool 150 may determine one or more groupings of the data flow objects based on one or more user annotations. The user annotations may indicate whether to group, collapse, and/or expand a given data flow object, regardless of the determination in those regards by the data modeling tool 150. In other words, a user may specify an annotation to manually preempt and/or override any behavior of the data modeling tool 150 that may not be desired. In some embodiments, one or more data flow objects may be hidden completely from the generated view based on the user annotations indicating which information assets are deemed to be unimportant to the user in a given data flow model.

As described above, in one embodiment, the groupings may be determined based on one or more predetermined grouping factors such as the ontology, the object type specification, the edge counts, and the user annotations. For a given data flow object, however, the grouping suggested by a first grouping factor may conflict with the grouping suggested by a second grouping factor. For example, the data modeling tool 150 may determine that the data flow object should be grouped with a first grouping based on the ontology and a second grouping based on the object type specification. At least in some embodiments, the data flow object is not allowed to be grouped with both of what would otherwise be two disjoint groupings, thus resulting in the conflict. To resolve conflicts, the data modeling tool 150 may assign weights to each grouping factor—or combination of grouping factor and data flow object—and resolve the conflicts in favor of the grouping factor having the highest weight.

In one embodiment, the weights may be determined based on one or more predefined weighting rules. At least in some embodiments, each grouping factor has an associated set of one or more weighting rules. Each weight may be a numerical value within a predefined range of valid values. In one embodiment, the weighting rule for the ontology may specify to determine a weight based on a measure of completeness of the ontology. The weighting rule for the object type specification may specify to determine a weight commensurate with a depth of the object type in the object type hierarchy. In other words, object types lower in the hierarchy are assigned higher weights relative to object types higher in the hierarchy. For instance, assume that the data modeling tool 150 stores weights in a two-dimensional array W[n][f], where W is a name of the array, where n represents the total count of data flow objects in the data flow model, and where f represents the total count of distinct grouping factors. Put another way, the two-dimensional array W[n][f] stores a weight associated with each weighting factor for each data flow object in the data flow model. In one embodiment, an ETL job, being disposed lower in the object type hierarchy, may be assigned a weight in the range of [0.8, 1], while a data warehouse, being disposed higher in the object type hierarchy, may be assigned a weight in the range of [0.3, 0.7].

In one embodiment, the weighting rule for the edge counts may specify to determine a weight based on one or more attributes associated with the data flow model, such as a scenario type that is being modeled. The weighting rule for the user annotations may specify to determine a weight based on a role of the user creating the user annotations, such that more significant roles are assigned higher weights. For example, the data modeling tool 150 may assign low weights for end users, medium weights for business analysts, and high weights for data stewards.

In one embodiment, after determining the weights for the grouping factors for each data flow object in the data flow model, the data modeling application 150 groups data flow objects based on the grouping factors, resolving conflicts based on the determined weights. In some embodiments, the data modeling application 150 may further adjust the weights based on user input specifying a measure of ease of use of the generated view. The data modeling application 150 may take into account the adjusted weights when generating subsequent views of the data flow model.

Figure 5:
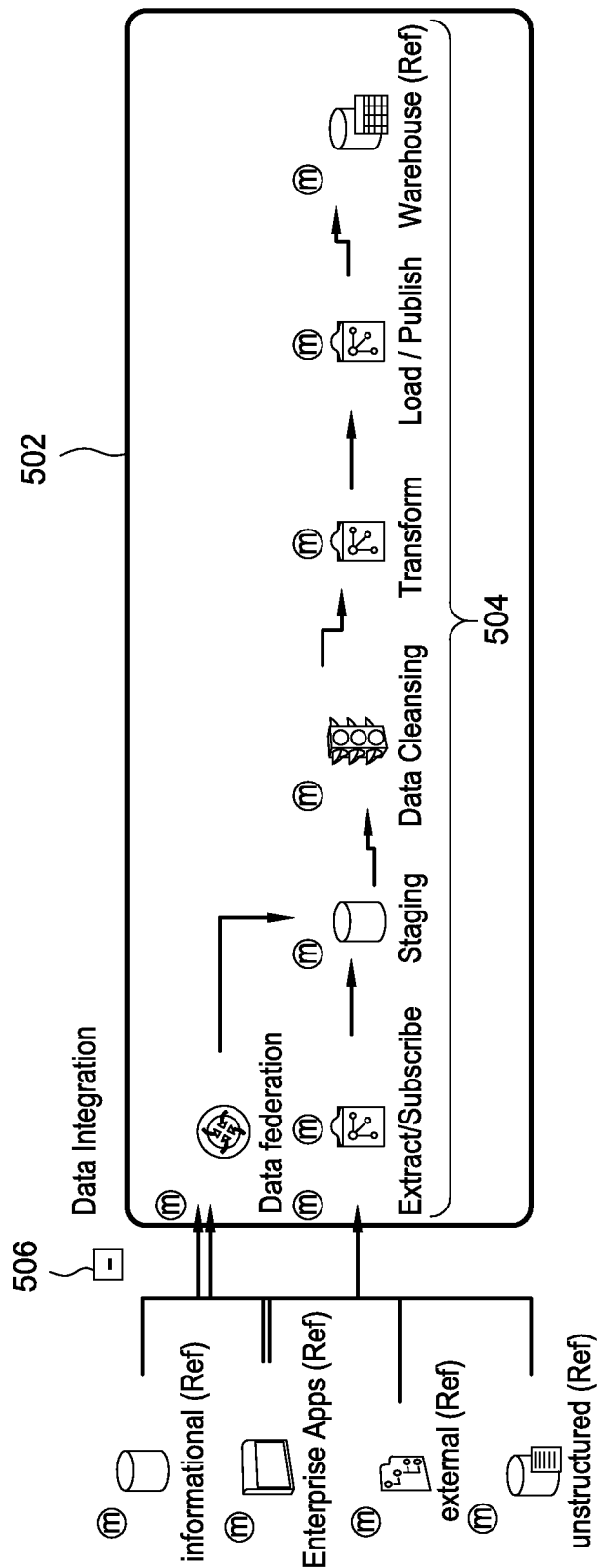
FIG. 5 illustrates another view of a data flow model, according to one embodiment of the invention.

FIG. 5 illustrates a view 500 of a data flow model, according to one embodiment of the invention. In one embodiment, the data modeling tool 150 may determine whether to group together multiple data flow objects 504 into a grouping 502 having an associated control 506 for collapsing/expanding the grouping 502. In some embodiments, the data modeling tool 150 may also determine whether to collapse or expand the grouping 502 by default—i.e., when the grouping 502 is first presented to the user. These determinations may be made, for example, based on the object type specification 400 of FIG. 4. For instance, the data modeling tool 150 may determine to expand the grouping 502 by default upon determining that the contained data flow objects 504 form a chain of data flow objects having an edge count of one within the chain and exceeding a predefined length or, alternatively, exceeding a predefined count of levels in the object type hierarchy. The data modeling tool 150 may determine, from the chain, that the contained data flow objects should not be grouped together. Alternatively, the data modeling tool 150 may determine that the contained data flow objects should be grouped together but not collapsed. The manner in which the object type specification 400 is used in grouping, expanding and/or collapsing may be tailored to suit the needs of a particular case. For example, the determinations described above may additionally be based upon whether the user interface of the data modeling application 150 has sufficient room for displaying a grouping in expanded fashion, where the room may be measured in terms of a ratio between a count of data flow objects visible in the user interface and a maximum count of data flow objects supported by the current size of the user interface (e.g., as measured in pixels).

Figure 6:
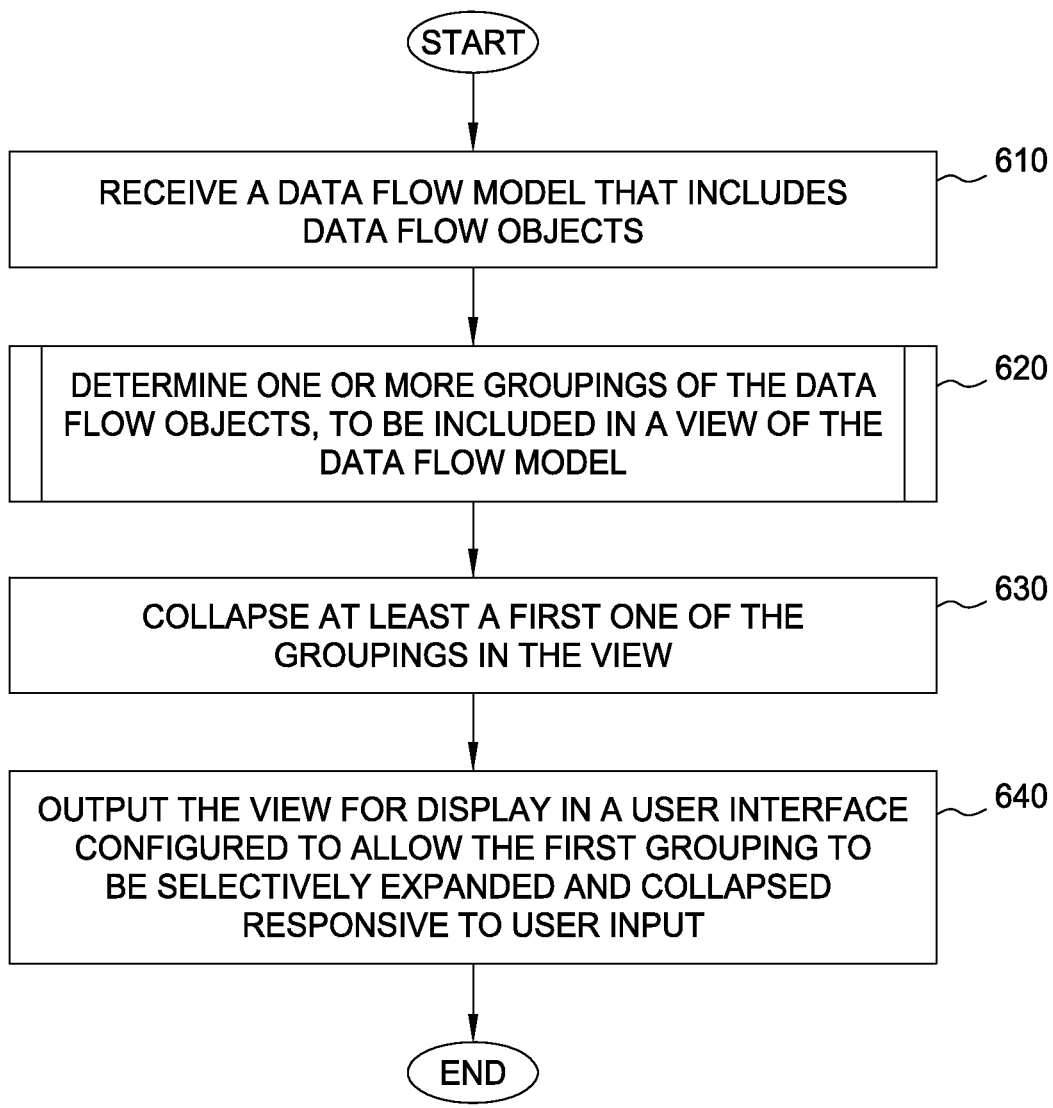
FIG. 6 is a flowchart depicting a method for generating a view of a data flow model, according to one embodiment of the invention.

FIG. 6 is a flowchart depicting a method 600 for generating a view of a data flow model, according to one embodiment of the invention. As shown, the method 600 begins at step 610, where the data modeling tool 150 receives a data flow model that includes data flow objects. At step 620, the data modeling tool 150 determines one or more groupings of the data flow objects, to be included in the view. The step 620 is further described below in conjunction with FIG. 7. At step 630, the data modeling tool 150 collapses at least a first one of the groupings in the view or, alternatively, determine that the first grouping remain expanded. Depending on the embodiment, the collapsing step may be performed as part of step 620. At step 640, the data modeling tool 150 outputs the view for display in a user interface configured to allow the first grouping to be selectively expanded and collapsed responsive to user input. After the step 640, the method 600 terminates.

Figure 7:
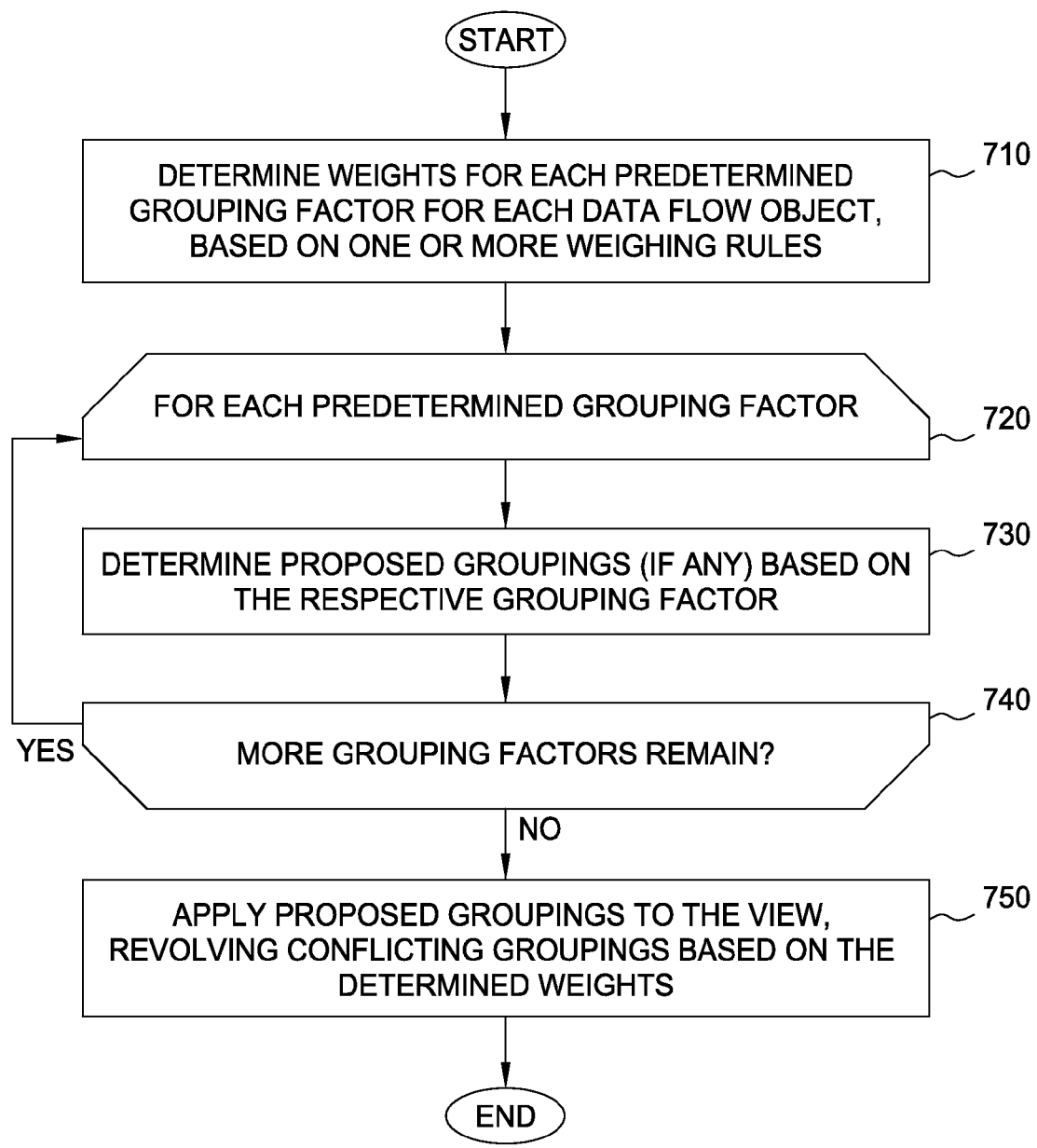
FIG. 7 is a flowchart depicting a method for determining one or more groupings of the data flow objects, according to one embodiment of the invention.

FIG. 7 is a flowchart depicting a method 700 for determining one or more groupings of the data flow objects, according to one embodiment of the invention. The method 700 corresponds to the step 620 of FIG. 6. As shown, the method 700 begins at step 710, where the data modeling tool 150 determines weights each combination of grouping factor and data flow object, based on one or more weighting rules. At step 720, the data modeling tool 150 enters a loop to process each grouping factor. At step 730, the data modeling tool 150 determines proposed groupings (if any) based on the respective grouping factor. At step 740, the data modeling tool 150 determines whether additional grouping factors remain. If so, the method 700 returns to the step 720 to process a next grouping factor. Otherwise, the data modeling tool applies proposed groupings to the view, resolving conflicting groupings based on the determined weights (step 750). After the step 750, the method 700 terminates.

Accordingly, embodiments of the invention provide techniques for generating a view of a data flow model. One embodiment provides a viewing tool configured to determine one or more groupings of data flow objects based on one or more grouping factors. The viewing tool is further configured to collapse at least a first grouping in the view and output the view for display in a user interface configured to the first grouping to be selectively expanded and collapsed responsive to user input. By using the techniques disclosed herein, the viewing tool may generate views that are more user-friendly at least in some cases, at least relative to alternative approaches that do not involve programmatically grouping and/or collapsing data flow objects, alternative approaches that do not consider the grouping factors disclosed herein, or alternative approaches that group data flow objects solely based on manual user input. Further, although embodiments of the invention have been disclosed with reference to generating a view of a data flow model, other embodiments are broadly contemplated. For example, the techniques disclosed herein may generally be applied to any user interface display of a set of hierarchically related visual elements.

While the foregoing is directed to embodiments of the present invention, other and further embodiments of the invention may be devised without departing from the basic scope thereof, and the scope thereof is determined by the claims that follow.

What is claimed is:

1. A computer-implemented method for generating a view of a data flow model, comprising:
  receiving the data flow model, wherein the data flow model includes a plurality of data flow objects;
  determining, one or more groupings of the plurality of data flow objects and by operation of one or more computer processors, each grouping containing a respective plurality of data flow objects wherein the one or more groupings are determined based on at least three grouping factors selected from: (i) an ontology; and (ii) an object type specification for the data flow objects; (iii) counts of edges of the data flow objects; and (iv) one or more user annotations of the data flow objects; each of the at least three grouping factors having a respective weight determined based on one or more weighting rules and with which a grouping conflict is resolved in favor of the grouping factor having the highest weight;
  collapsing at least a first one of the groupings in the view, such that the first grouping is visible in the view while any data flow object in the first grouping is not visible; and
  outputting the view for display in a user interface configured to selectively expand and collapse the first grouping based on user input.

2. The computer-implemented method of claim 1, wherein expanding the first grouping comprises rendering the first grouping and any data flow object in the first grouping visible in the view.

3. The computer-implemented method of claim 1, wherein, the one or more groupings are determined based on the object type specification for the data flow objects.

4. The computer-implemented method of claim 1, wherein, the one or more groupings are determined based on the counts of edges of each the data flow objects.

5. The computer-implemented method of claim 1, wherein, the one or more groupings are determined based on the one or more user annotations of the data flow objects.

6. A computer program product, comprising:
  a computer-readable memory having computer-readable program code embodied therewith for generating a view of a data flow model, the computer-readable program code comprising:
    computer-readable program code configured to receive the data flow model, wherein the data flow model includes a plurality of data flow objects,
    computer-readable program code configured to determine, one or more groupings of the plurality of data flow objects and by operation of one or more computer processors, each grouping containing a respective plurality of data flow objects, wherein the one or more groupings are determined based on at least three grouping factors selected from: (i) an ontology; and (ii) an object type specification for the data flow objects; (iii) counts of edges of the data flow objects; and (iv) one or more user annotations of the data flow objects; each of the at least three grouping factors having a respective weight determined based on one or more weighting rules and with which to resolve a grouping conflict in favor of the grouping factor having the highest weight;
    computer-readable program code configured to collapse at least a first one of the groupings in the view, such that the first grouping is visible in the view while any data flow object in the first grouping is not visible; and
    computer-readable program code configured to output the view for display in a user interface configured to selectively expand and collapse the first grouping based on user input.

7. The computer program product of claim 6, wherein expanding the first grouping comprises rendering the first grouping and any data flow object in the first grouping visible in the view.

8. The computer program product of claim 6, wherein, the one or more groupings are determined based on the object type specification for the data flow objects.

9. The computer program product of claim 6, wherein, the one or more groupings are determined based on the counts of edges of the data flow objects.

10. The computer program product of claim 6, wherein, the one or more groupings are determined based on the one or more user annotations of the data flow objects.

11. A system, comprising:

one or more computer processors;

a memory containing a program, which when executed by the one or more computer processors is configured to perform an operation for generating a view of a data flow model, the operation comprising:

receiving the data flow model, wherein the data flow model includes a plurality of data flow objects; determining, one or more groupings of the plurality of data flow objects, each grouping containing a respective plurality of data flow objects, wherein the one or more groupings are determined based on at least three grouping factors selected from: (i) an ontology; and (ii) an object type specification for the data flow objects; (iii) counts of edges of the data flow objects; and (iv) one or more user annotations of the data flow objects; each of the at least three grouping factors having a respective weight determined based on one or more weighting rules and with which to resolve a grouping conflict in favor of the grouping factor having the highest weight;

collapsing at least a first one of the groupings in the view, such that the first grouping is visible in the view while any data flow object in the first grouping is not visible; and outputting the view for display in a user interface configured to selectively expand and collapse the first grouping based on user input.

12. The system of claim 11, wherein expanding the first grouping comprises rendering the first grouping and any data flow object in the first grouping visible in the view.

13. The system of claim 11, wherein, the one or more groupings are determined based on the object type specification for the data flow objects.

14. The system of claim 11, wherein, the one or more groupings are determined based on the counts of edges of the data flow objects.

15. The system of claim 11, wherein the ontology characterizes associations between terms retrieved from a predefined hierarchy of terms, wherein the ontology includes the hierarchy of terms, wherein the ontology is usable in order to determine a semantic distance between terms, wherein the semantic distance is measured in terms of a count of associations between terms.

16. The system of claim 15, wherein the object type specification describes a set of data flow object types and associated attributes, wherein the attributes comprise granularity, edge frequency, valid parent nodes, and valid child nodes, wherein the object types are organized via an object type hierarchy, wherein the object type hierarchy is included in the object type specification.

17. The system of claim 16, wherein the granularity characterizes a depth of an object type in the object type hierarchy, wherein the edge frequency characterizes an expected count of edges that a data flow object of an object type.

18. The system of claim 17, wherein the one or more groupings comprise a plurality of groupings, wherein the one or more user annotations are generated based at least in part on input received from a user, wherein the one or more user annotations comprise a plurality of user annotations including:

a first user annotation specifying to group a given data flow object;

a second user annotation specifying to collapse a first grouping of the plurality of groupings; and a third user annotation specifying to expand a second grouping of the plurality of groupings.

19. The system of claim 18, wherein the one or more weighting rules comprise a plurality of weighting rules including:

a first weighting rule specifying to determine a weight based on a measure of completeness of the ontology;

a second weighting rule specifying to determine a weight commensurate with a depth of the object type in the object type hierarchy;

a third weighting rule specifying to determine a weight based on one or more attributes associated with the data flow model; and a fourth weighting rule specifying to determine a weight based on a user role associated with the user;

wherein each grouping factor has an associated, distinct set of one or more weighting rules.

* * * * *